(12) United States Patent
Yagi et al.

(10) Patent No.: US 8,183,991 B2
(45) Date of Patent: May 22, 2012

(54) VEHICLE LIGHTING DEVICE FOR ILLUMINATING OBJECTS AROUND A VEHICLE DETECTED BY AN INFRARED SENSOR

(75) Inventors: Takayuki Yagi, Shizuoka (JP); Noriko Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 644 days.

(21) Appl. No.: 12/171,747

(22) Filed: Jul. 11, 2008

(65) Prior Publication Data

US 2009/0015388 A1    Jan. 15, 2009

(30) Foreign Application Priority Data

Jul. 12, 2007    (JP) .................................. 2007-183549

(51) Int. Cl.
*B60Q 1/00*    (2006.01)
(52) U.S. Cl. ........ 340/435; 340/436; 340/901; 340/904; 250/338.1; 362/465
(58) Field of Classification Search ................ 340/426.6
See application file for complete search history.

(56) References Cited

U.S. PATENT DOCUMENTS

| | | | | |
|---|---|---|---|---|
| 5,321,450 A | * | 6/1994 | Shapiro et al. | ................ 353/119 |
| 5,826,962 A | * | 10/1998 | Rodriguez, Jr. | ................ 353/82 |
| 6,229,597 B1 | * | 5/2001 | Kikuchi | ....................... 356/4.01 |
| 2003/0045984 A1 | * | 3/2003 | Horii et al. | ....................... 701/49 |
| 2004/0094717 A1 | * | 5/2004 | Griffin et al. | ................. 250/349 |
| 2005/0200473 A1 | * | 9/2005 | Noguchi et al. | .............. 340/507 |
| 2006/0028374 A1 | * | 2/2006 | Fullerton | ......................... 342/67 |
| 2006/0146552 A1 | * | 7/2006 | Shaffer | ......................... 362/465 |
| 2007/0159312 A1 | | 7/2007 | Chen et al. | |
| 2007/0211484 A1 | * | 9/2007 | Marchal | ......................... 362/507 |
| 2007/0252086 A1 | * | 11/2007 | Chou et al. | ..................... 250/353 |
| 2009/0015891 A1 | * | 1/2009 | Kane | ............................. 359/198 |

FOREIGN PATENT DOCUMENTS

| | | |
|---|---|---|
| JP | 2005-205950 A | 8/2005 |
| WO | 2005080859 A1 | 9/2005 |

OTHER PUBLICATIONS

English abstract of JP2005205950 published Aug. 4, 2005, esp@cenet database, 1 page.
Office Action Issued in Japanese Patent Application No. 2007-183549, Dated Jul. 5, 2011 (10 Pages with English Translation).

* cited by examiner

*Primary Examiner* — Benjamin C Lee
*Assistant Examiner* — Curtis King
(74) *Attorney, Agent, or Firm* — Osha • Liang LLP

(57) ABSTRACT

A vehicle lighting device includes: an infrared sensor which detects an object around a vehicle using infrared light; a visible light source which illuminates visible light to the object when the infrared sensor detects the object; a reflection mirror which reflects the infrared light and the visible light to an area around the vehicle; and a light path adjusting mechanism which adjusts light paths of the infrared light and the visible light in a synchronizing manner by rotating the reflection mirror.

5 Claims, 10 Drawing Sheets

VEHICLE LIGHTING DEVICE FOR ILLUMINATING OBJECTS AROUND A VEHICLE DETECTED BY AN INFRARED SENSOR

This application is based on and claims priority from Japanese Patent Application No. 2007-183549, filed on Jul. 12, 2007, the entire contents of which are hereby incorporated by reference.

BACKGROUND

1. Technical Field

The present disclosure relates to a vehicle lighting device using an infrared sensor and a visible light source.

2. Background Art

In the past, a technique has been known for detecting a pedestrian or an obstacle around a vehicle using an infrared sensor and illuminating visible light from a visible light source to a detected object so as to assist a driver to see the object. For instance, JP-A-2005-205950 discloses an illumination device which photographs the pedestrian in an area in front of the vehicle at night using an infrared camera and detects a position of the pedestrian using an image processing device so as to illuminate visible light to a plurality of pedestrians in such a manner that a motor rotates a spot lamp to adjust a light path of the visible light.

However, according to the known illumination device, because the spot lamp is rotated in order to adjust the light path of the visible light, it is necessary to control a direction of the spot lamp in accordance with image data of the infrared camera. For this reason, it is necessary to use a high-cost image processing device. Also, it takes time to rotate a large-weight light source as well as takes time to process the image. As a result, there is a problem with a response to the detected object. Accordingly, when a fast moving object (for instance, a bicycle) is detected, a visible light illumination range may be later than the object. In addition, it is necessary to use a visible light source (for instance, a fog lamp) in addition to the spot lamp in order to handle a case where two objects are continuously detected.

SUMMARY

In an aspect of one or more embodiments of the present invention, a vehicle lighting device is provided that is capable of accurately illuminating the visible light to an object around the vehicle by allowing the visible light source to respond in a short time when an infrared sensor is operated.

According to one or more embodiments of the present invention, a vehicle lighting device includes: an infrared sensor which detects an object around a vehicle using infrared light; a visible light source which illuminates visible light to the object when the infrared sensor detects the object; a reflection mirror which reflects the infrared light and the visible light to an area around the vehicle; and a light path adjusting mechanism which adjusts light paths of the infrared light and the visible light in a synchronizing manner by rotating the reflection mirror.

According to one or more embodiments of the present invention, at least one reflection mirror may be used as the reflection mirror. Specifically, it is possible to employ a configuration in which one reflection mirror reflects the infrared light and the visible light to the area around the vehicle in the substantially same direction. Accordingly, it is advantageous in that the light path adjusting mechanism for rotating the reflection mirror can be simply configured. In addition, it is possible to employ a configuration in which two reflection mirrors independently reflect the infrared light and the visible light to the area in front of the vehicle. In this case, it is advantageous in that a pattern or an illumination timing of the visible light is independently set differently from that of the infrared light.

The light path adjusting mechanism is configured as a one-axis or a two-axis actuator. Specifically, the light path adjusting mechanism is configured as the one-axis actuator which rotates the reflection mirror about the vertical axis. Accordingly, it is possible to adjust the light paths of the infrared light and the visible light to the area around the vehicle at a high-speed in a horizontal direction. In addition, the light path adjusting mechanism may be configured as the two-axis actuator which rotates the reflection mirror about the horizontal axis and the vertical axis. In this case, it is possible to adjust the light paths of the infrared light and the visible light to the broad area around the vehicle in a synchronizing manner. In addition, it is desirable that the one-axis or two-axis actuator is an electromagnetically-driven actuator which can rotate the reflection mirror at a high speed of 30 Hz or more.

According to the vehicle lighting device, because the light paths of the infrared light and the visible light are optically synchronized with each other using the reflection mirror, it is possible to allow the visible light source to respond in a short time when the infrared sensor detects the object. For this reason, even when the fast object is detected, it is possible to accurately detect the object within the visible light illumination range and to illuminate the visible light to a plurality of objects at a high speed. Accordingly, it is advantageous in that the object around the vehicle can be accurately illuminated with a simple configuration not requiring the image processing device or the plurality of visible light sources.

Other aspects and advantages of the invention will be apparent from the following description, the drawings and the claims.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION

Figure 1:
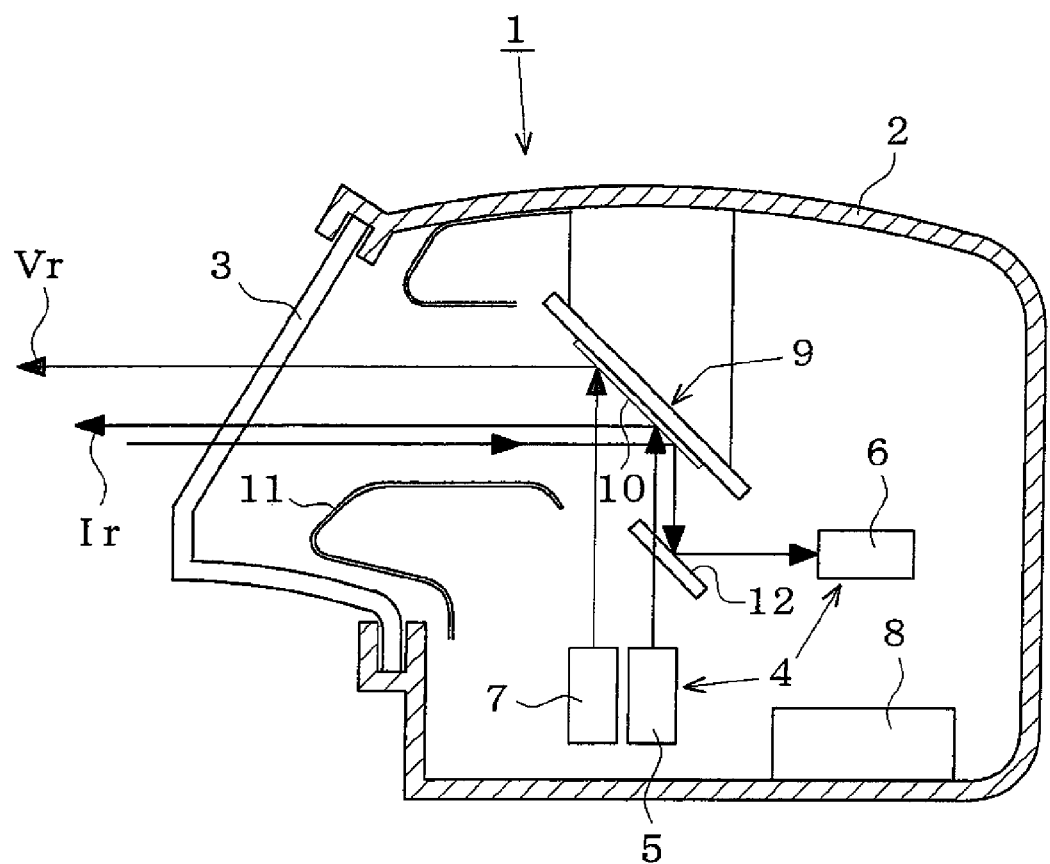
FIG. 1 is a sectional view illustrating a vehicle lighting device according to a first embodiment of the present invention.
Figure 2:
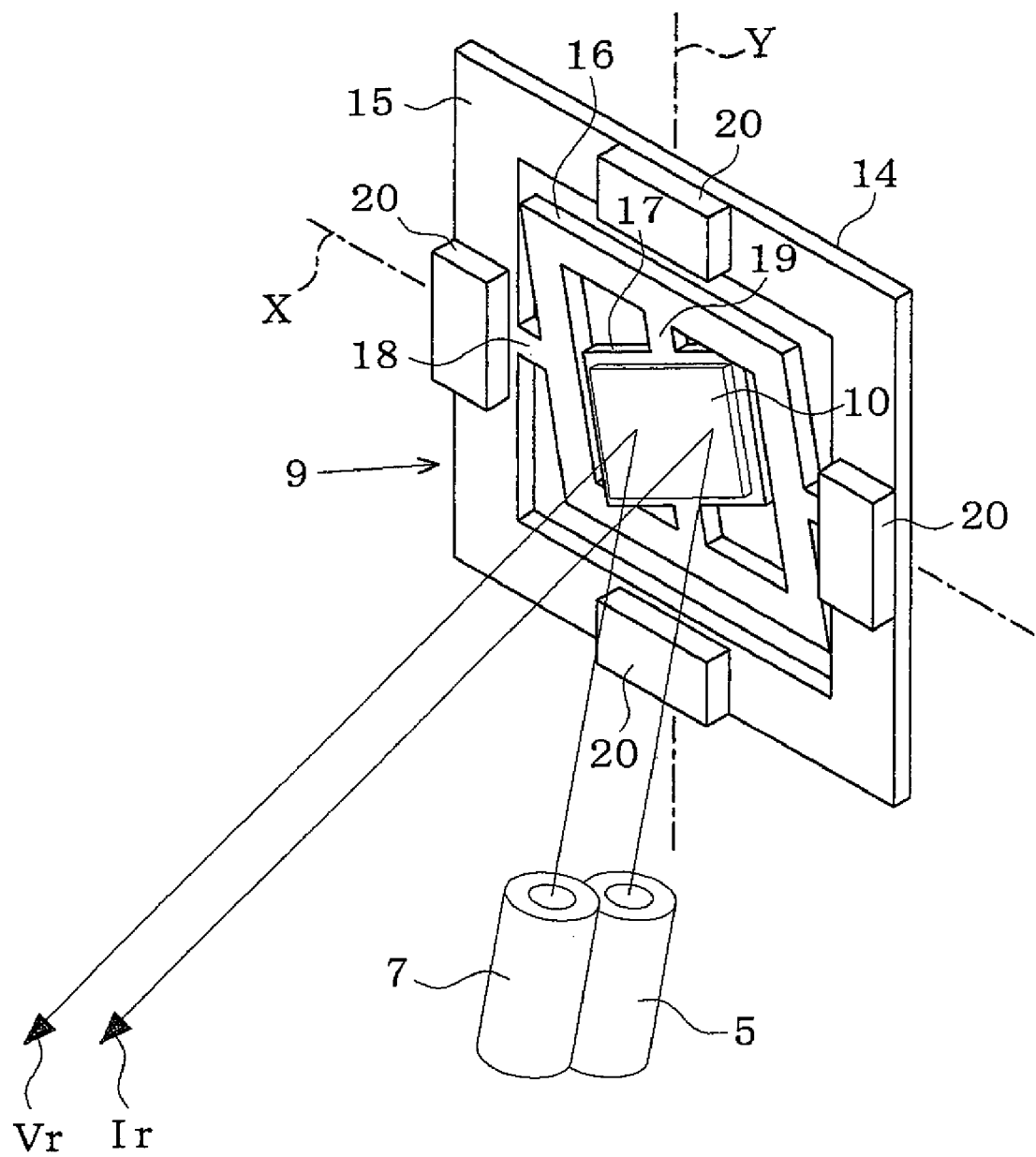
FIG. 2 is a perspective view illustrating a light path adjusting mechanism of the vehicle lighting device.
Figure 3:
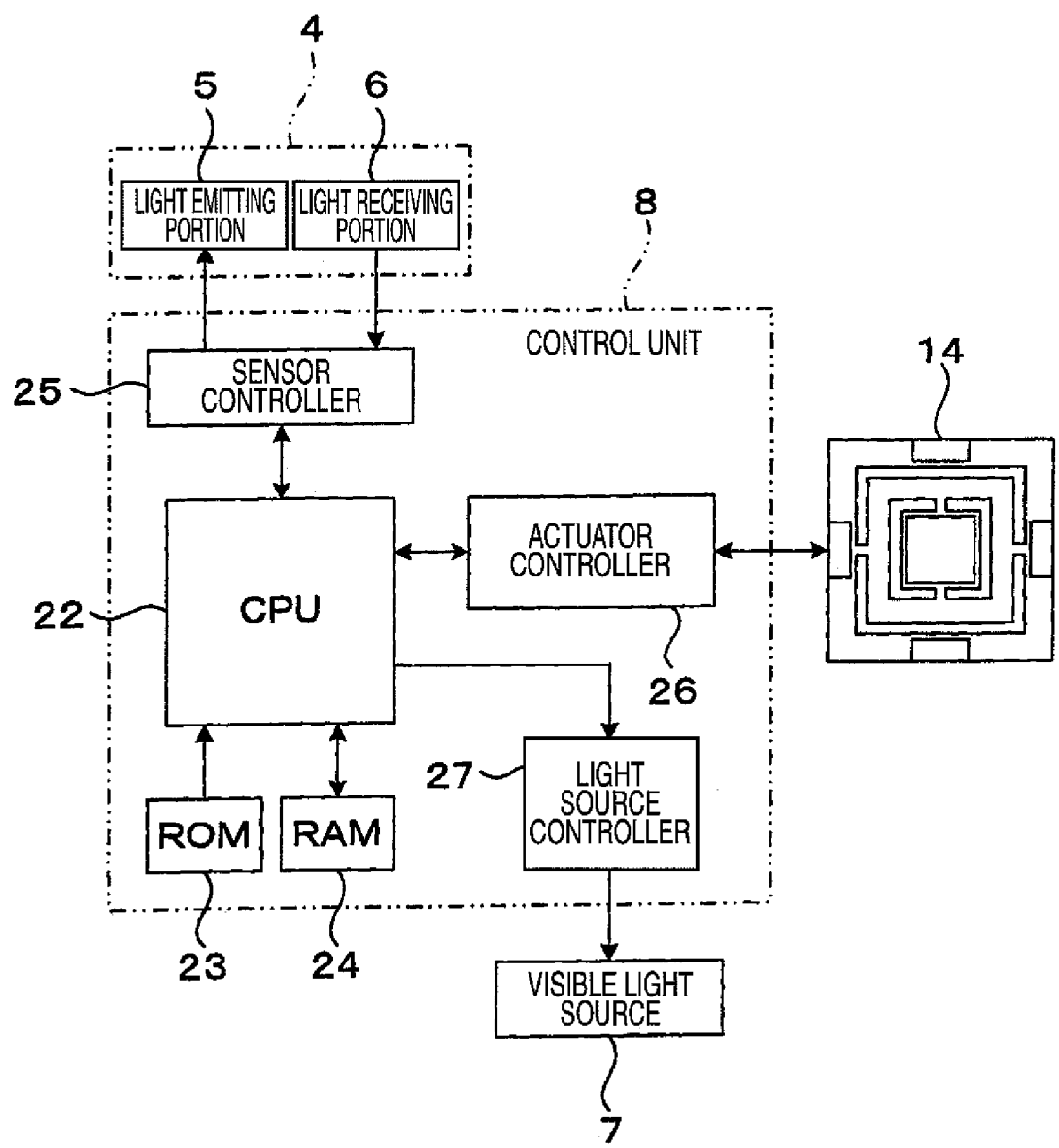
FIG. 3 is a block view illustrating a control unit of the vehicle lighting device.
Figure 4:
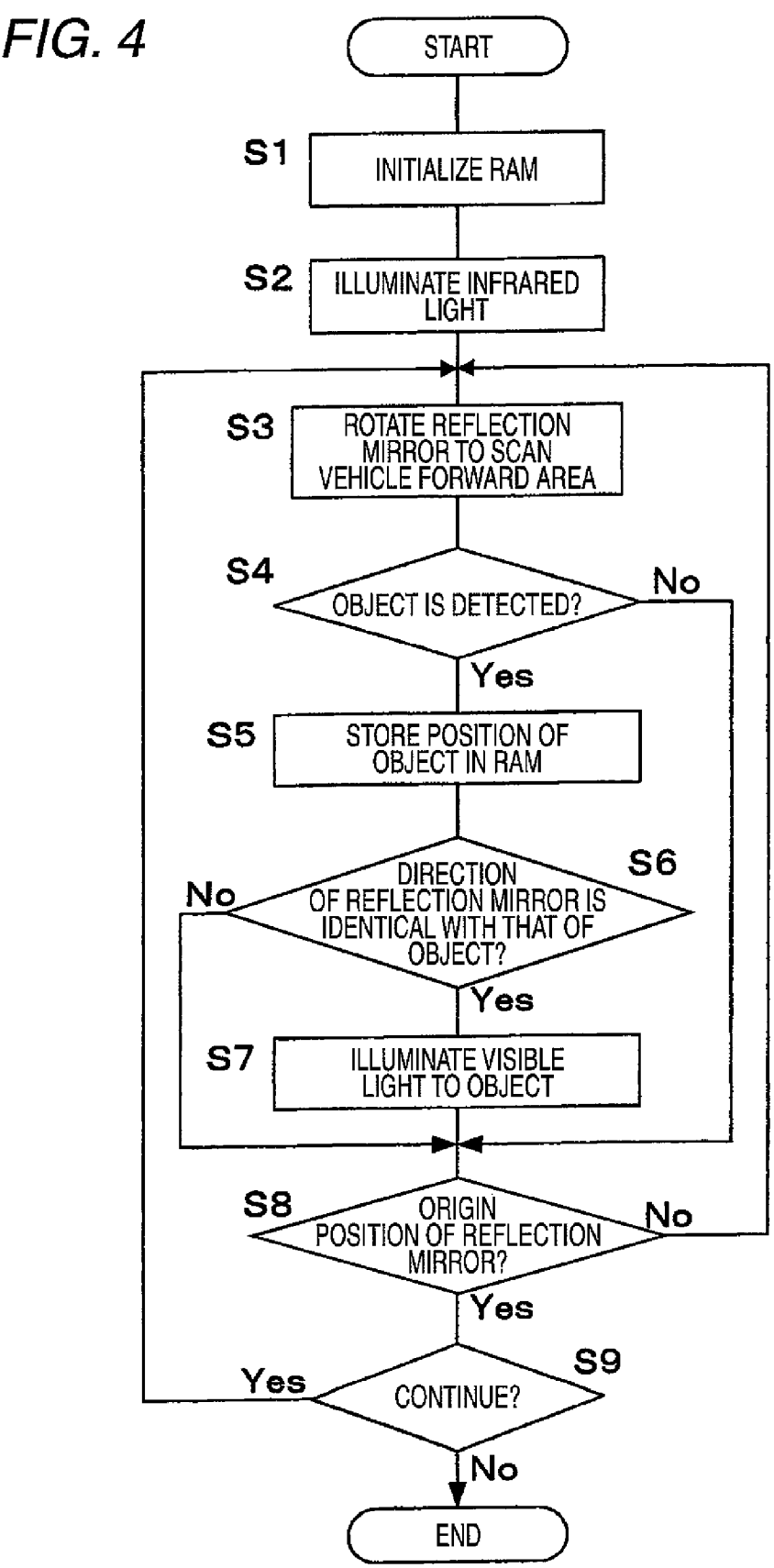
FIG. 4 is a flowchart illustrating an operation of the vehicle lighting device.
Figure 5A:
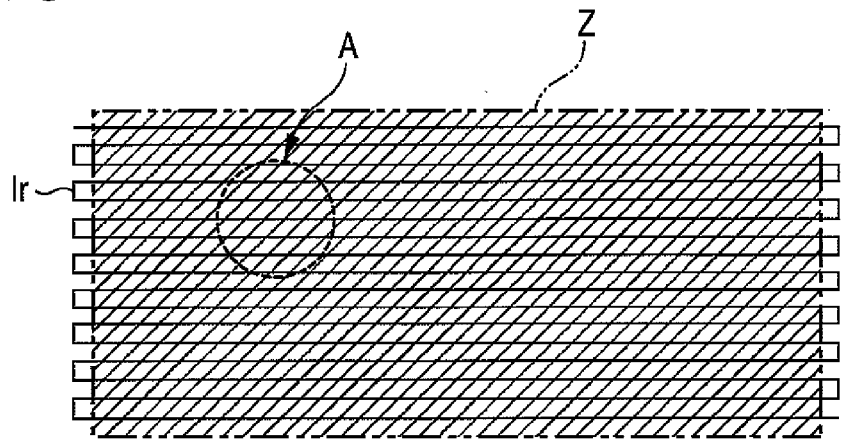
FIGS. 5A to 5C are illumination model views illustrating an operation of the vehicle lighting device.
Figure 5B:
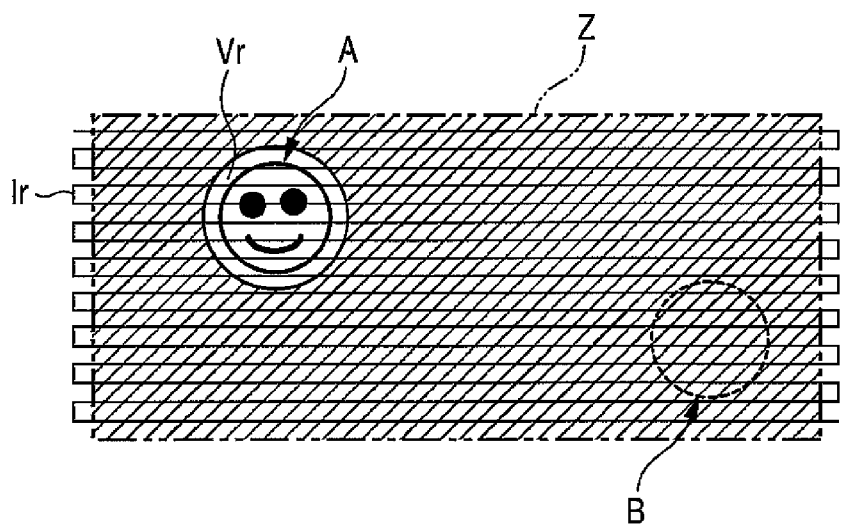
Figure 5C:
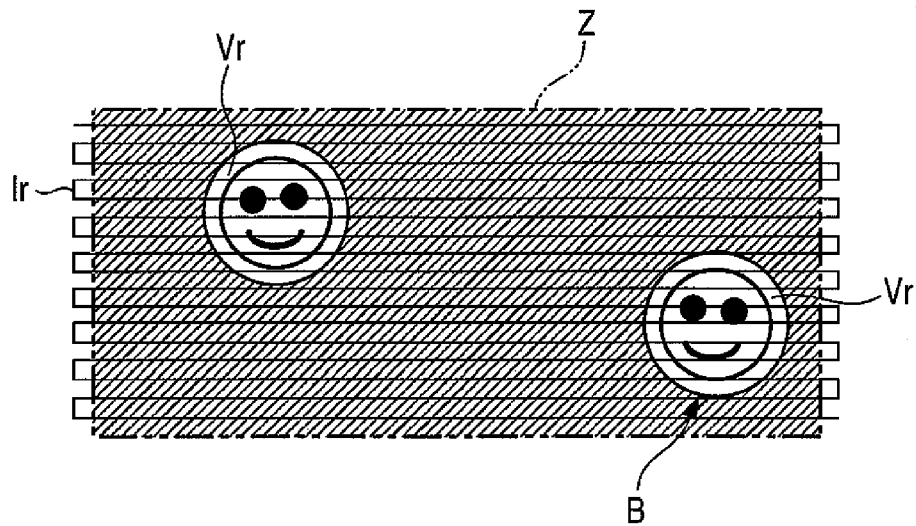
Figure 6:
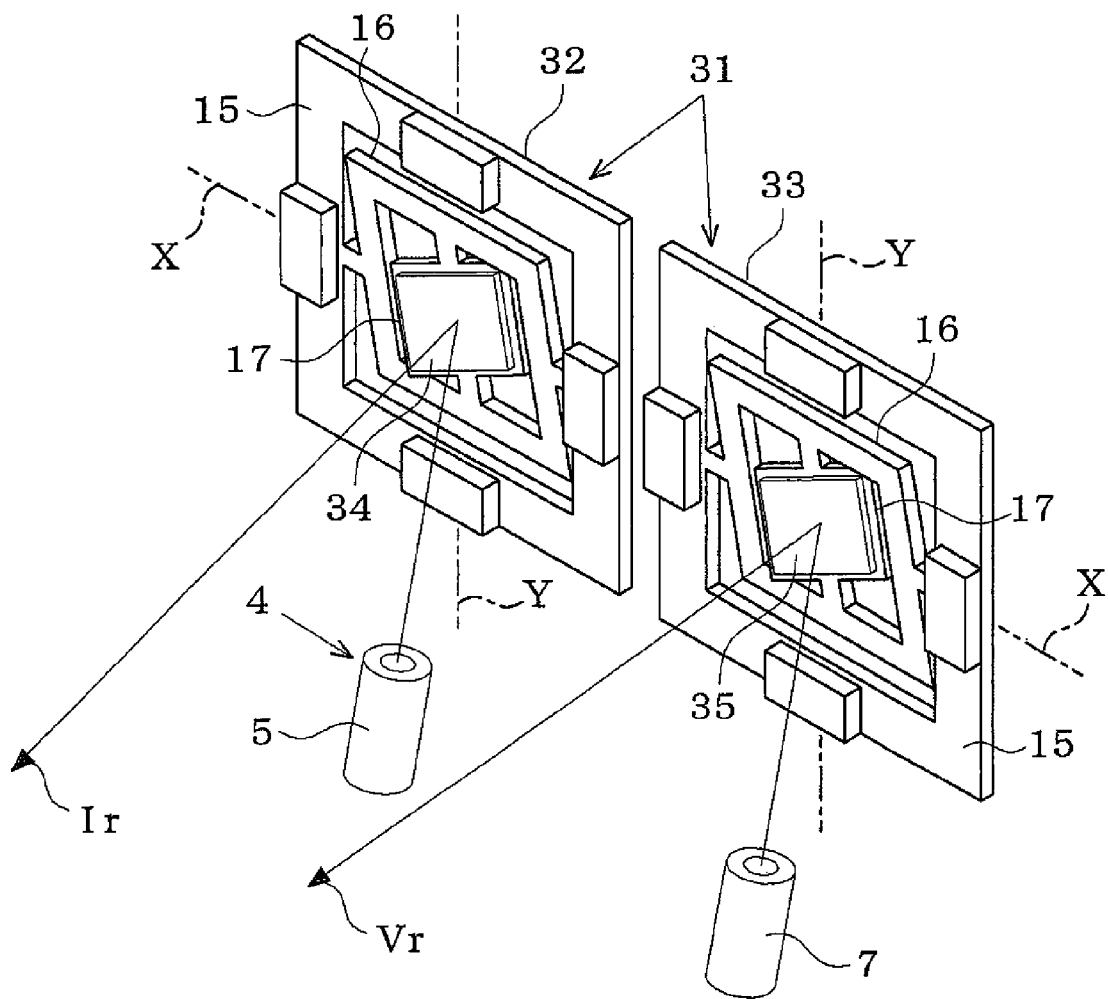
FIG. 6 is a perspective view illustrating the light path adjusting mechanism according to a second embodiment of the present invention.
Figure 7:
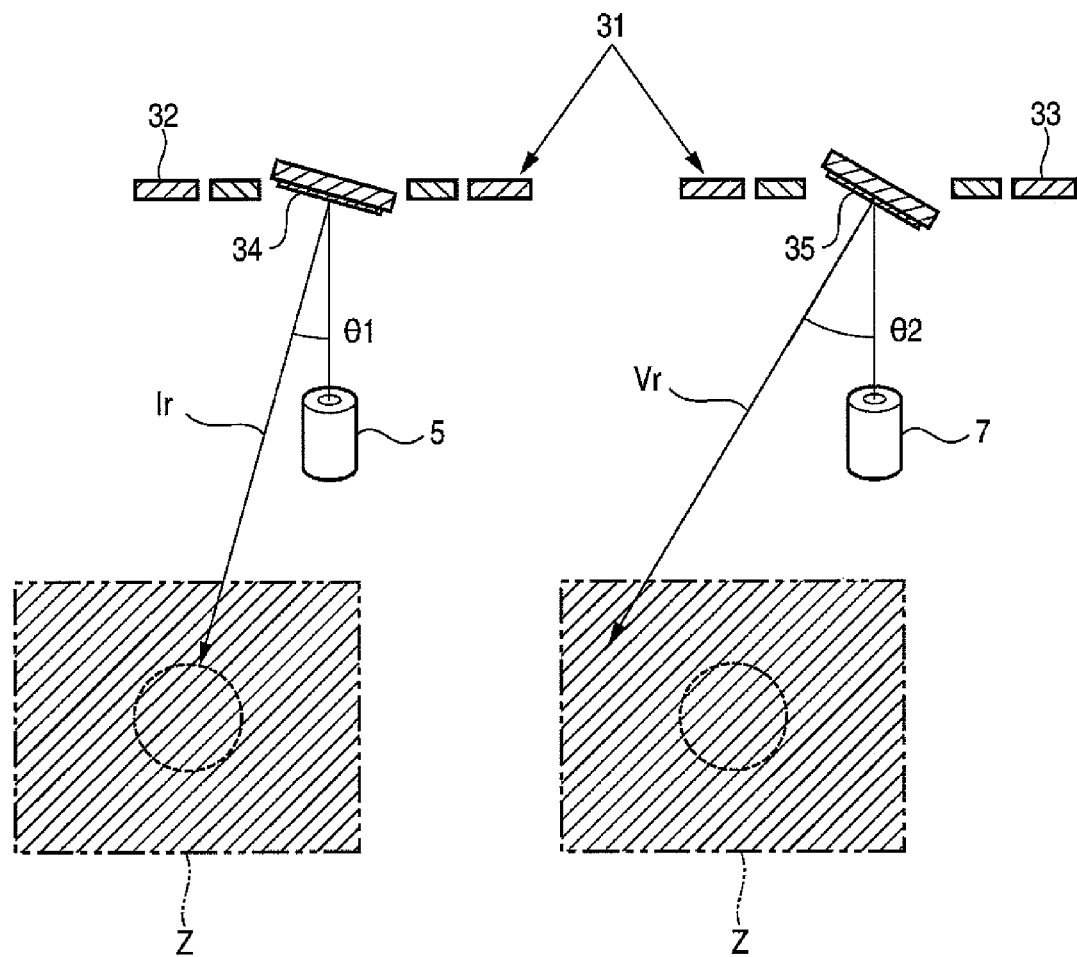
FIG. 7 is an illumination model view illustrating the operation of the light path adjusting mechanism.
Figure 8:
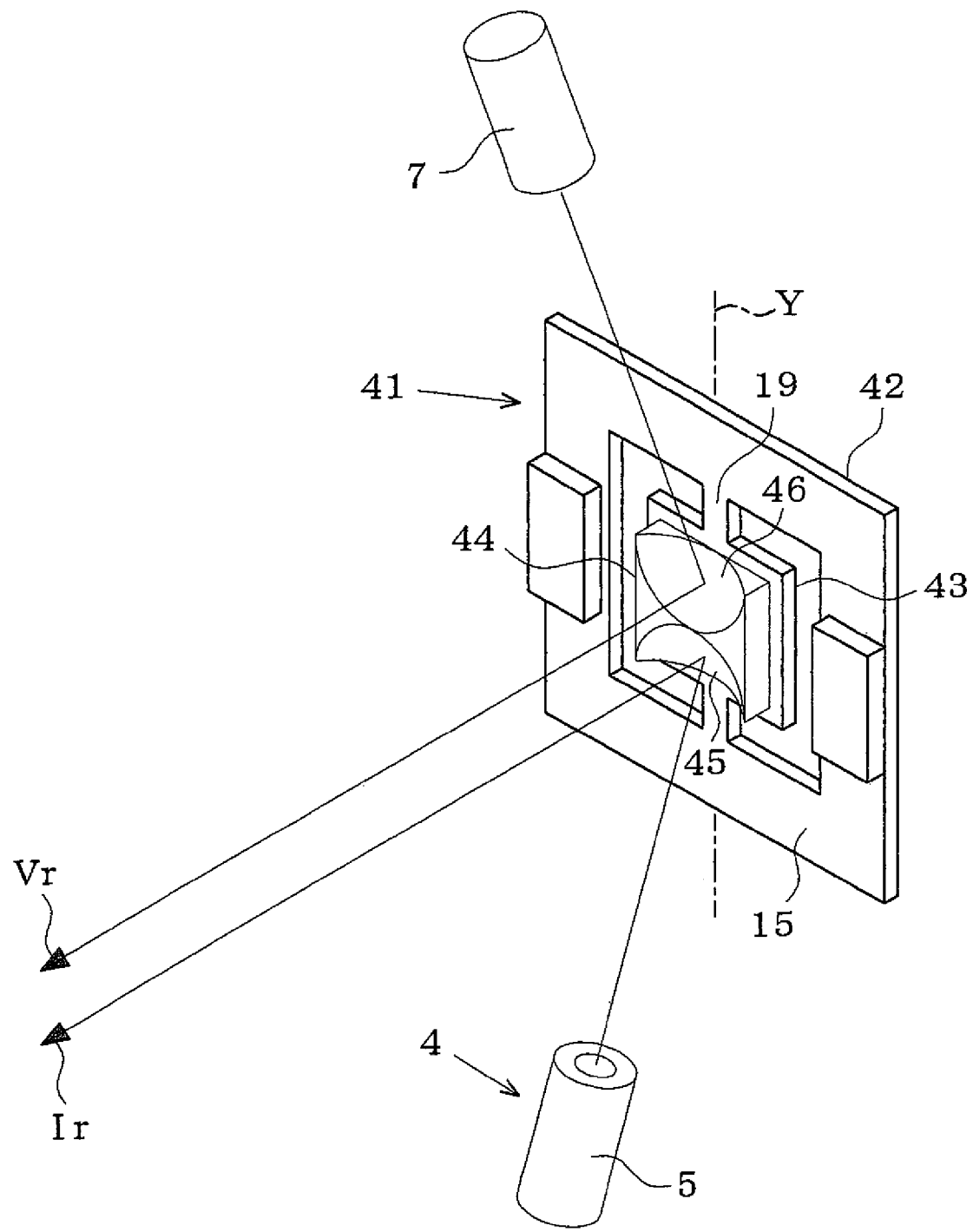
FIG. 8 is a perspective view illustrating the light path adjusting mechanism according to a third embodiment of the present invention.
Figure 9:
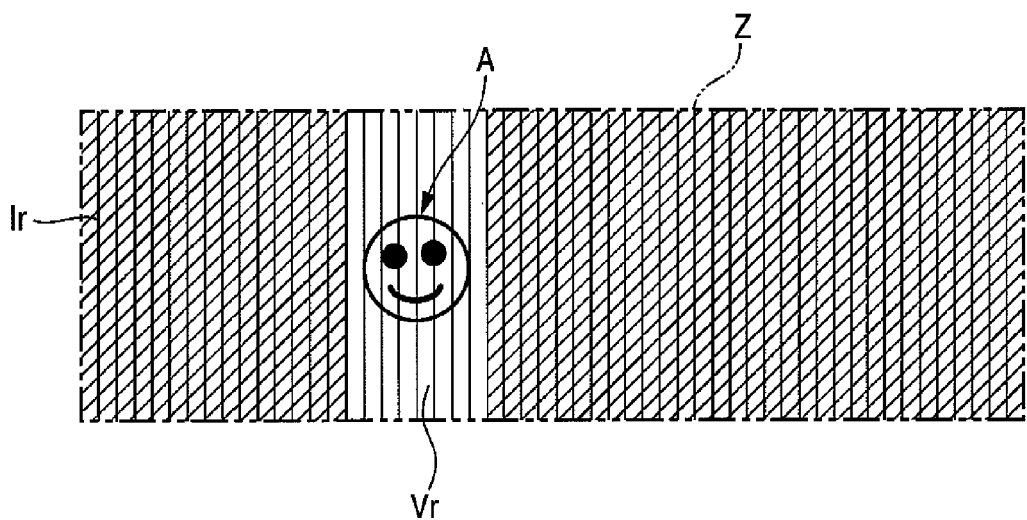
FIG. 9 is an illumination model view illustrating the operation of the light path adjusting mechanism.
Figure 10:
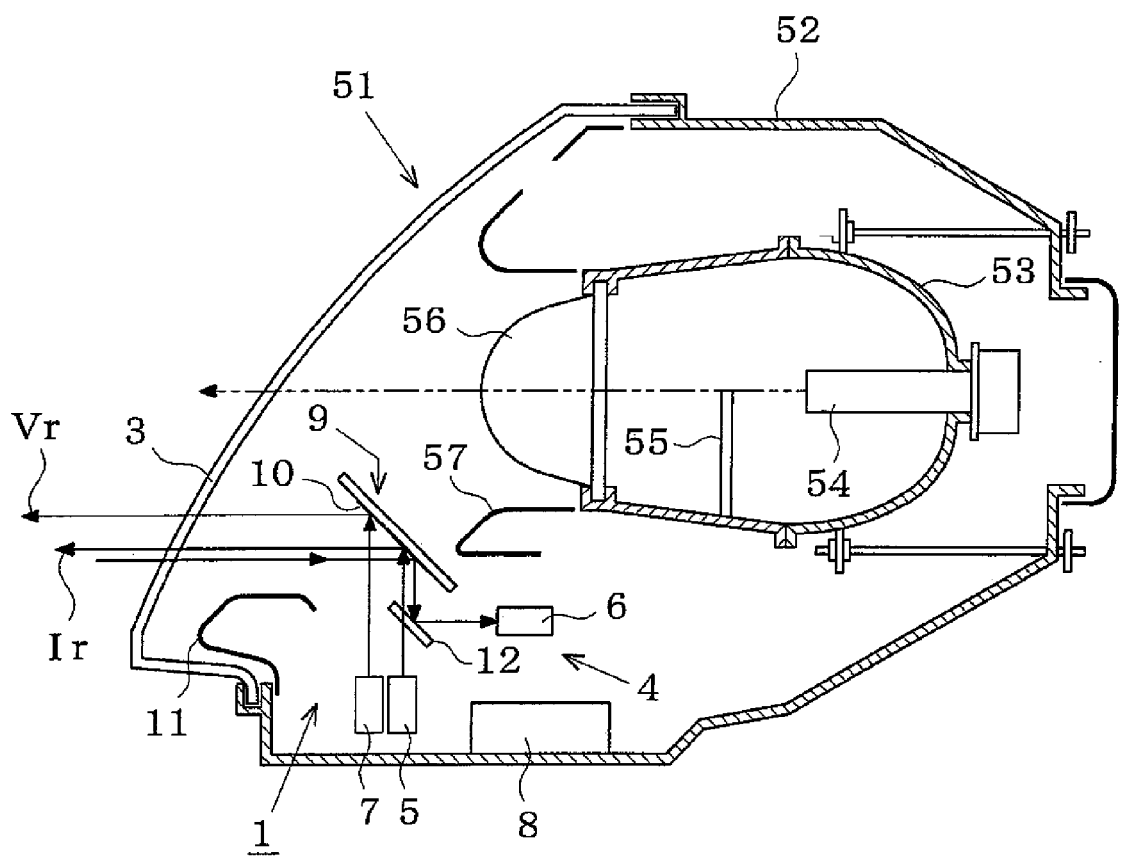
FIG. 10 is a sectional view illustrating a headlight unit according to a fourth embodiment of the present invention.
Figure 11:
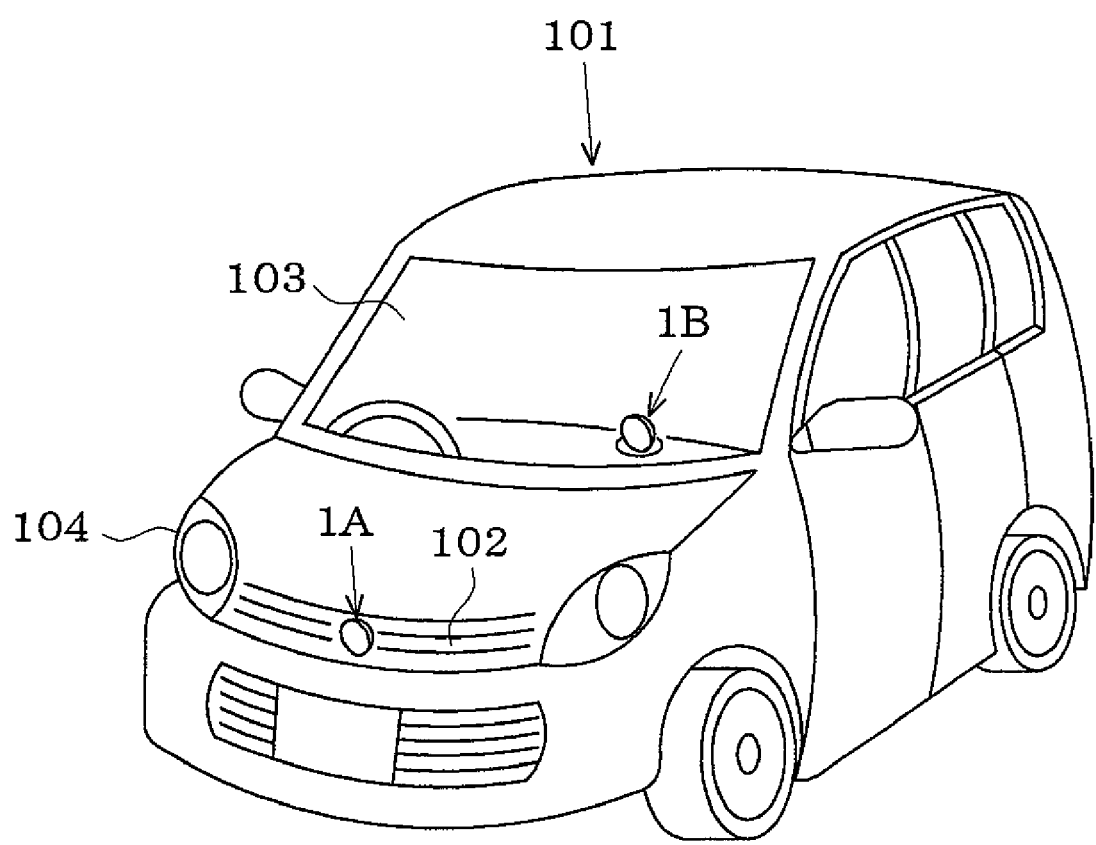
FIG. 11 is a perspective view illustrating an exemplary position where the vehicle lighting device is installed.

Hereinafter, exemplary embodiments of the present invention will be described with reference to the accompanying drawings. FIG. 1 shows a whole part of a vehicle lighting device according to a first embodiment. FIG. 2 shows a configuration of a light path adjusting mechanism. FIG. 3 shows a configuration of a control unit. FIGS. 4 and 5 show an operation of the vehicle lighting device. FIG. 6 shows the light path adjusting mechanism of the vehicle lighting device according to a second embodiment. FIG. 7 shows an operation of the light path adjusting mechanism. FIG. 8 shows the light path adjusting mechanism of the vehicle lighting device according to a third embodiment. FIG. 9 shows an operation of the vehicle lighting device. FIG. 10 shows a headlamp including the vehicle lighting device according to a fourth embodiment. FIG. 11 shows an exemplary position where the vehicle lighting device is installed.

First Embodiment

As shown in FIG. 1, a vehicle lighting device 1 according to the first embodiment includes a housing 2 so that the vehicle lighting device 1 is installed as a single component at a proper position of the vehicle. For instance, in a vehicle 101 (see FIG. 11), a vehicle lighting device 1A and a vehicle lighting device 1B are installed at a front vehicle body, that is, the center of a front grill 102 and a position inside a windshield 103, respectively, so as to be away from headlights 104. In addition, the vehicle lighting device 1 may be installed at a rear vehicle body or a side vehicle body, and a plurality of vehicle lighting devices 1 may be installed at some positions of the vehicle body.

A light transmitting cover 3 is provided in a front surface of the housing 2, and an infrared sensor 4 is installed in the housing 2. The infrared sensor 4 includes a light emitting portion (an infrared light source) 5 and a light receiving portion 6, and a visible light source 7 and a control unit 8 are disposed around the light emitting portion 5. A light path adjusting mechanism 9 is installed above the light emitting portion 5 and the visible light source 7, and a reflection mirror 10 is provided in a front surface of the light path adjusting mechanism 9. An extension 11 is provided between the reflection mirror 10 and the light transmitting cover 3, and a half mirror 12 is mounted between the reflection mirror 10 and the light receiving portion 6 with interposed therebetween.

While the vehicle lighting device 1 is turned on, the light emitting portion 5 illuminates infrared light Ir with a pulse shape for a given cycle. The reflection mirror 10 reflects the infrared light Ir toward a vehicle forward area, and the infrared light Ir returning from the vehicle forward area is received by the light receiving portion 6 through the half mirror 12. The light receiving portion 6 outputs a detection signal in accordance with an incident light amount to the control unit 8, and the control unit 8 selectively turns on or off the visible light source 7 based on a level of the detection signal. Then, when the visible light source 7 is turned on, the reflection mirror 10 reflects visible light Vr to the vehicle forward area in the substantially same direction as the infrared light Ir.

In addition, the half mirror 12 may be omitted in such a manner that the light receiving portion 6 of the infrared sensor 4 is installed parallel to a position around the light emitting portion 5 or the light receiving portion 6 is integrally mounted to the light emitting portion 5. When the light receiving portion 6 is adjacent to the visible light source 7, it is desirable that an infrared filter is provided in the light receiving portion 6 so as not to be influenced by the infrared light included in the visible light Vr.

As shown in FIG. 2, the light path adjusting mechanism 9 is configured as an electromagnetically-driven two-axis actuator 14. The actuator 14 includes two rotation members 16 and 17 provided inside a base 15 fixed to the housing 2 of the illumination device 1. The outside rotation member 16 is supported to a horizontal shaft 18 configured as a torsion spring so as to be rotatable about a horizontal axis X with respect to the base 15. The inside rotation member 17 is supported to a vertical shaft 19 configured as a torsion spring so as to be rotatable about a vertical axis Y with respect to the rotation member 16, and the reflection mirror 10 is fixed to the front surface of the inside rotation member 17.

Four permanent magnets 20 are provided in the base 15, and coils (not shown) are wired to the rotation members 16 and 17. The permanent magnets 20 form a magnetic field in a direction perpendicular to the horizontal shaft 18 and the vertical shaft 19, and the control unit 8 controls a magnitude and a direction of current flowing to the coils. Then, torque caused by Lorenz force is generated from the rotation members 16 and 17, and the reflection mirror 10 rotates in a reciprocating manner about the horizontal axis X and the vertical axis Y up to a position where the torque is equal to a restoring force of the shafts 18 and 19 so that one reflection mirror 10 adjusts the light paths of the infrared light Ir and the visible light Vr in a synchronizing manner.

As shown in FIG. 3, the control unit 8 includes a CPU 22 which controls a whole part of the vehicle lighting device 1, a ROM 23 which stores therein control programs or various setting values, and a RAM 24 which serves as an operation memory. The control unit 8 further includes a sensor controller 25 which controls an ON/OFF state and output of the light emitting portion 5 and which processes the detection signal output from the light receiving portion 6, and an actuator controller 26 which controls driving current flowing to the two-axis actuator 14 and which processes a return signal, and a light source controller 27 which controls an ON/OFF state and output of the visible light source 7.

Next, an operation of the vehicle lighting device 1 with the above-described configuration will be described with reference to FIGS. 4 and 5A to 5C. When the vehicle lighting device 1 is turned on, the control program shown in FIG. 4 starts. First the RAM 24 and the like are initialized (S1). Subsequently, the light emitting portion 5 of the infrared sensor 4 is turned on so as to illuminate the infrared light Ir to the vehicle forward area using the reflection mirror 10 (S2). Subsequently, the two-axis actuator 14 is driven so that the reflection mirror 10 rotates about the horizontal axis and the vertical axis, and as shown in FIG. 5, the vehicle forward area Z is scanned by the infrared light Ir in a given pattern (S3).

During the scanning operation using the infrared light Ir, it is determined whether the infrared sensor 4 detects an object existing in the vehicle forward area by comparing the level of the detection signal output from the light receiving portion 6 with the setting value (S4). For instance, as shown in FIG. 5A, when it is determined that an object A exists in the vehicle forward area Z, the current direction of the reflection mirror 10 (an operation angle of the actuator 14) is stored in the RAM 24 as the position of the object A (S5). Subsequently, it is determined whether the current direction of the reflection mirror 10 is identical with the position of the object detected by the past scanning operation (S6).

When it is determined that the current direction of the reflection mirror 10 is not identical with the position of the object detected by the first scanning operation, an origin position (a mechanical origin position of the actuator 14) of the reflection mirror 10 is checked (S8), a continuous operation of the program is checked (S9), and then a second scanning operation continues. Then, when the reflection mirror 10 faces the object A at the second scanning operation, the visible light source 7 is turned on for a setting time, and as shown in FIG. 5B, the visible light Vr is illuminated to the object A (S7). At a third scanning operation, as shown in FIG. 5C, the visible light Vr is intermittently illuminated to two objects A and B detected by the second scanning operation.

With the vehicle lighting device 1 according to this embodiment, the vehicle lighting device 1 is different from the known vehicle lighting device using an image processing device in that the reflection mirror 10 optically adjusts the light paths of the infrared light Ir and the visible light Vr in a synchronizing manner. The vehicle lighting device 1 can simultaneously perform the detecting operation for detecting a plurality of objects A and B and the illuminating operation for illuminating the visible light Vr. An illumination timing of the visible light Vr is late by one-time scanning operation, but the low-weight reflection mirror 10 can rotate at a high speed. Accordingly, it is possible to obtain higher responsibility than the known vehicle lighting device which rotates a light source. As a result, it is possible to accurately illuminate the fast object existing in the vehicle forward area.

Second Embodiment

The vehicle lighting device according to the second embodiment is different from the vehicle lighting device according to the first embodiment in that the light path adjusting mechanism is differently configured. As shown in FIG. 6, a light path adjusting mechanism 31 according to the second embodiment includes two two-axis actuators 32 and 33. The light emitting portion 5 of the infrared sensor 4 is installed in the first actuator 32 and the visible light source 7 is installed in the second actuator 33. Reflection mirrors 34 and 35 are respectively provided in the inside rotation members 17 of the actuators 32 and 33, and the first reflection mirror 34 and the second reflection mirror 35 respectively illuminate the infrared light Ir and the visible light Vr to the vehicle forward area.

The CPU 22 (see FIG. 3) of the control unit 8 controls two actuators 32 and 33 so that the second reflection mirror 35 rotates later than the first reflection mirror 34 by a predetermined angle. Then, as shown in FIG. 7, when the object A is detected using the infrared light Ir, the current direction of the first reflection mirror 34 is stored as the position of the object A in the RAM 24 using a time corresponding to a delay angle ($\theta=\theta1-\theta2$) of the reflection mirrors 34 and 35. Then, when the second reflection mirror 35 rotates in the same direction as the stored information, the visible light source 7 is turned on.

With the configuration according to the second embodiment, because the light path of the visible light Vr is synchronized with the light path of the infrared light Ir in a state where the light path of the visible light Vr is later than the light path of the infrared light Ir, it is possible to simultaneously detect the object A using the infrared light Ir and to illuminate the visible light Vr to the object during the same scanning operation. For this reason, it is not necessary to delay the illumination timing of the visible light Vr by one-time scanning operation, and thus it is advantageous in that much higher responsibility can be obtained than that according to the first embodiment. In addition, two reflection mirrors 34 and 35 may be installed in parallel in the common base by integrally forming the bases 15 of the two actuators 32 and 33.

Third Embodiment

As shown in FIG. 8, in the vehicle lighting device according to the third embodiment, a light path adjusting mechanism 41 is configured as a one-axis actuator 42, and an electromagnetic action allows a rotation member 43 of the actuator 42 to rotate about the vertical axis Y in the same way as the first embodiment. A reflection mirror 44 is provided in the rotation member 43, and a pair of reflection surfaces 45 and 46 is formed in the reflection mirror 44. The light emitting portion 5 of the infrared sensor 4 illuminates the infrared light Ir to the first reflection surface 45 and the visible light source 7 illuminates the visible light Vr to the second reflection surface 46 so that one reflection mirror 44 reflects the infrared light Ir and the visible light Vr to the vehicle forward area in the substantially same direction.

As shown in FIG. 9, the first reflection surface 45 reflects the infrared light Ir in an elongate slit shape in a vertical direction, and the second reflection surface 46 reflects the visible light Vr in an elongate stripe shape in a vertical direction. Then, when the object A is detected by scanning the vehicle forward area Z using the infrared light Ir in a horizontal direction, the direction of the reflection mirror 44 is stored. When the reflection mirror 44 rotates in the same direction as the object A during the continuous scanning operation, the visible light source 7 is turned on. With the configuration according to the third embodiment, it is advantageous in that the vehicle forward area Z can be scanned at a high speed using the one-axis actuator 42 which is compact in size and low in cost.

Fourth Embodiment

The vehicle lighting device according to the fourth embodiment is provided in the left and right headlamps 104 (see FIG. 11) of the vehicle 101. As shown in FIG. 10, a headlamp unit 51 includes a holder 53 provided in a body 52, and the holder 53 is provided with a valve 54, a shade 55, a lens 56, and the like. An extension 57 is provided around the lens 56, and the infrared sensor 4 of the vehicle lighting device 1 is installed in an area which is optically insulated by the extension 57.

Then, the headlamp unit 51 forms a low beam pattern in which the valve 54 has a cut-off line in the vehicle forward area so that the visible light source 7 illuminates a pedestrian or an obstacle in the vehicle forward area in terms of a spot lamp when the infrared sensor 4 is operated. With the configuration according to the fourth embodiment, because the headlamp unit 51 can obtain a high function by adding an emergency illumination function to a normal illumination function, it is advantageous in that safe driving conditions at night are improved.

Exemplary embodiments of the present invention are not limited to the first to fourth embodiments, but the configurations of the respective components may be adequately modified, for example as described below, within the scope and without departing from the spirit of the invention.

(1) The vehicle lighting device 1 according to the first or third embodiment may be modified such that the visible light illumination range is set to a broad range so as to simultaneously turn on the visible light source 7 upon detecting the object.

(2) The light path adjusting mechanism 31 according to the second embodiment may be modified such that two one-axis actuators are installed in parallel instead of the two-axis actuator.

(3) The headlight unit 51 according to the fourth embodiment may use the light path adjusting mechanism 31 according to the second embodiment or the light path adjusting mechanism 41 according to the third embodiment.

(4) A high-speed device such as a motor, a piezoelectric actuator, or a galvanometer scanner may be used as a driving unit for the light path adjusting mechanism.

While the present invention has been shown and described with reference to certain exemplary embodiments thereof other implementations are within the scope of the claims. It will be understood by those skilled in the art that various changes in form and details may be made therein without departing from the spirit and scope of the invention as defined by the appended claims.

What is claimed is:

1. A vehicle lighting device comprising:
    an infrared sensor comprising:
        an infrared light emitting portion configured to emit infrared light; and
        a light receiving portion configured to detect an object that is present in a vehicle forward area, using the infrared light;
    a visible light source configured to illuminate visible light;
    a reflection mirror configured to reflect the infrared light and the visible light to the vehicle forward area;
    an actuator configured to change light paths of the infrared light and the visible light by rotating the reflection mirror, wherein the actuator scans the vehicle forward area using the infrared light by changing the light path of the infrared light so as to detect the object; and
    a memory configured to store position information of the object when the infrared sensor detects the object by scanning operation of the actuator,
    wherein the actuator irradiates the visible light to the object by changing the light path of the visible light in accordance with the position information stored in the memory.

2. The vehicle lighting device according to claim 1, wherein the reflection mirror is configured to reflect the infrared light and the visible light to the vehicle forward area in the substantially same direction.

3. The vehicle lighting device according to claim 1, wherein the actuator is a one-axis actuator which rotates the reflection mirror about a given vertical axis.

4. The vehicle lighting device according to claim 1, wherein the actuator is a two-axis actuator which rotates the reflection mirror about a given horizontal axis and a given vertical axis.

5. A vehicle lighting device comprising:
    an infrared sensor comprising:
        an infrared light emitting portion configured to emit infrared light; and
        a light receiving portion configured to detect an object that is present in a vehicle forward area, using the infrared light;
    a visible light source configured to emit visible light;
    a first reflection mirror configured to reflect the infrared light to the vehicle forward area;
    a second reflection mirror configured to reflect the visible light to the vehicle forward area;
    a first actuator configured to change a light path of the infrared light by rotating the first reflection mirror, wherein the first actuator scans the vehicle forward area using the infrared light by changing the light path of the infixed light so as to detect the object;
    a memory configured to store position information of the object when the infrared sensor detects the object by scanning operation of the first actuator; and
    a second actuator configured to change a light path of the visible light by rotating the second reflection mirror, wherein the second actuator irradiates the visible light to the object by changing the light path of the visible light in accordance with the position information stored in the memory.

\* \* \* \* \*